United States Patent [19]

Oliver et al.

[11] Patent Number: 5,574,233
[45] Date of Patent: Nov. 12, 1996

[54] NON-CONTACT RAILWAY WHEEL TEST APPARATUS AND METHOD

[75] Inventors: John D. Oliver, Flossmoor, Ill.; Roger M. Whitson, Wilsonville, Ala.

[73] Assignee: Amsted Industries Incorporated

[21] Appl. No.: 324,237

[22] Filed: Oct. 17, 1994

[51] Int. Cl.$^6$ .................. G01B 121/14; G01B 21/00; G01B 21/12; G01M 17/10

[52] U.S. Cl. .................. 73/865.8; 73/866.5; 356/385; 356/398; 324/207.14; 324/207.15; 324/207.22; 324/207.23

[58] Field of Search .................. 73/865.8, 865.9, 73/866.5, 146; 356/372, 385, 386, 398, 399, 400; 324/207.14, 207.15, 207.16, 207.18, 207.19, 207.22, 207.23, 207.25, 226, 207.17

[56] References Cited

U.S. PATENT DOCUMENTS

| | | | |
|---|---|---|---|
| 3,604,940 | 9/1971 | Matthews | 73/655 X |
| 3,908,446 | 9/1975 | Mruk | 73/620 |
| 3,918,816 | 11/1975 | Foster et al. | 73/146 X |
| 3,987,672 | 10/1976 | Loyer | 73/146 |
| 4,749,870 | 6/1988 | Schmelfuss et al. | 356/385 X |
| 4,798,963 | 1/1989 | Wittkupp et al. | 356/385 X |
| 4,863,266 | 9/1989 | Masuko et al. | 356/150 X |
| 4,866,642 | 9/1989 | Obrig et al. | 356/384 X |
| 4,904,939 | 2/1990 | Mian | 324/207.13 X |
| 4,988,192 | 1/1991 | Knittel | 356/138 |
| 5,146,795 | 9/1992 | Gebhart | 73/865.9 |

*Primary Examiner*—Thomas P. Noland
*Attorney, Agent, or Firm*—Edward J. Brosius; F. S. Gregorczyk; Stephen J. Manich

[57] ABSTRACT

The present invention provides a non-contact test apparatus and method for evaluating an as-manufactured railway wheel, which apparatus has a plurality of non-contact sensors positionable in proximity to various wheel locations and coupled to a controller for communication of a plurality of sensed dimensional parametric signals for comparison to specified wheel reference parameters in the controller to thereby simultaneously evaluate several dimensional parameters and characteristics for qualification of a railway wheel satisfying AAR specifications for railway wheels.

3 Claims, 6 Drawing Sheets

NON-CONTACT RAILWAY WHEEL TEST APPARATUS AND METHOD

BACKGROUND OF THE INVENTION

The present invention relates to testing and test apparatus and more specifically a test apparatus for railway wheels. These wheels are generally utilized on all types of railway vehicles including passenger cars, locomotives and freight cars. The majority of the wheels are utilized on freight cars and application of a quick and reliable analytical apparatus for these wheels is desired to expedite their evaluation prior to shipment for use. The reasons for the quick and reliable evaluation is not just the desire to increase productivity for shipment, but even more to evaluate wheel quality for expediting reworking, to minimize inventory, and to provide rapid evaluation of the manufacturing process for corrective measures.

Railway wheels must meet the specifications promulgated by the Association of American Railroads (AAR), which generally serves as the rail industry standard setter. The railway wheels must have the correct physical characteristics for use for their intended purpose. The AAR has defined specifications for wheel chemical composition, wheel hardness based on a Brinnell hardness test and finally the wheel must meet the specifications for various physical dimensions and parameters, such as rotundity, eccentricity and dimensional tolerance.

As in most gears, shafts and other rotating components, railway wheel specifications normally required that the wheel is round at its periphery; its axle bore is aligned with the wheel central longitudinal axis; it is flat on its front and rear faces; and, it must have a proper tread diameter, as well as proper thickness and proper tread face taper. All of these physical characteristic standards, and others, must be met to provide a railway wheel that is acceptable to the purchaser and meets the above-noted AAR specifications. The testing of these wheels with conventional jigs, fixtures and gages is time consuming and awkward, as each wheel typically weighs in excess of 600 pounds. As a consequence, handling of the wheels is difficult and the degree of accuracy may in some measure be dependent upon the skill of the inspector or the quality of an inspection tool for measuring a particular dimension or characteristic. However, there is no presently known apparatus that will measure a plurality of dimensions and characteristics of a railway wheel, with or without contact of the wheel, and provide all the necessary parametric tests of the wheel for evaluation against the standards of the AAR.

SUMMARY OF THE INVENTION

The present invention provides a test apparatus with non-contact sensors for evaluation of the physical parameters of an as-manufactured wheel. In the preferred embodiment, a fixture stand includes an apparatus to accept a railway wheel in a vertically upright position wherein its hub axis is horizontal, however it is clearly recognized that orientation of the wheel is the choice of the user. In this wheel-vertical arrangement, the wheel is retained between twin sets of rollers arranged in generally aligned and opposed positions at the upper and lower portions of the wheel in the fixture. The rollers appear as, or resemble, pulley sheaves to receive the wheel flange, and at least one of the sheaves is independently powered to rotate the wheel during testing.

Three sets of test sampling apparatus are provided utilizing combinations of induction and laser sensors to establish a virtual reference plane at one of the front and rear faces of the wheel. Thereafter, this reference plane is utilized for establishing the relative location of the apparatus to a plurality of test points about the wheel circumference, front and rear faces, the hub front and rear faces, and in the axle bore. The sensed data or signals points are provided to a signal sensor for comparison to empirical standard parameters measured from a standardized railway wheel or gage, and to provide an analytical signal to a printer or other storage and publication apparatus. The particular assembly and hardware for such comparator may be a computer-like machine coupled to a printer and/or an LED panel. The particular type of signal output is not a limitation to the present invention.

BRIEF DESCRIPTION OF THE DRAWINGS

In the figures of the drawings like reference numerals identify like components, and in the drawings.

DETAILED DESCRIPTION OF THE PREFERRED EMBODIMENT

Figure 1:
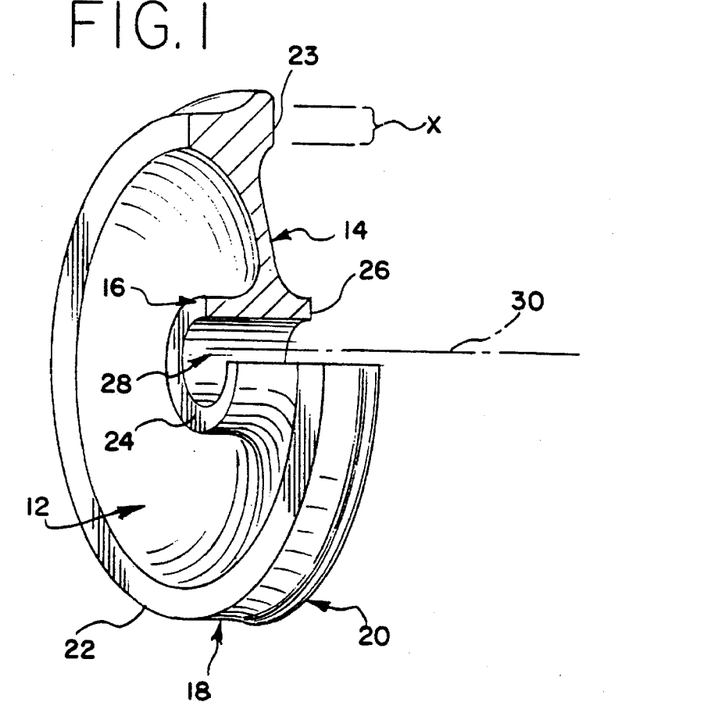
FIG. 1 is a side elevation view of a railway wheel with a partial cross-section.

Although railway wheels 10 in FIG. 1 may be manufactured by machining or forging, they are almost universally cast products, and more specifically they are most frequently steel wheels, which are pressure cast in graphite or sand molds. Wheel 10 in FIG. 1 includes front face or surface 12, rear face 14, hub 16, tread 18 and flange 20. Tread 18 has tread-rear face 23 on wheel rear face 14, and a slight downward or inward taper from its intersection with flange 20 to tread-front face 22. Hub 16 includes hub front face 24 and hub rear face 26 with bore 28 extending through hub 16 with longitudinal axis 30. It is noted that bore 28 is usually the only finish-machined surface on wheel 10, that is bore 28 has been turned in a lathe or ground in a grinding machine to provide a relatively smooth surface for mounting wheel 10 on an axle (not shown), while the remaining surfaces of wheel 10 are generally in the as-cast condition.

Railway wheels 10 are exposed to arduous service and are typically in excess of 600 pounds. As a consequence, wheels 10 are difficult and awkward for an individual to handle and manipulate. Although wheels 10 are large and cumbersome, they are subject to rigid dimensional standards set by the AAR. In particular, wheels 10 must be relatively flat from tread-front face 22 and hub front face 24 to tread-rear face 23 and hub rear face 26, respectively. In addition, the thickness between these respective faces 22, 23 and 24, 26 includes a specification tolerance. The several diameter dimensions are similarly critical characteristics with specification limits and tolerances set by the AAR. For example, the outside diameter of flange 20, the outside diameter of tread 18 at the tape line, which is the tread circumference in close proximity to flange 20. The taper of tread 18 may be analyzed by comparison of the wheel diameter at the tape line with the wheel diameter at the intersection of tapered tread 18 with tread front face 22.

A critical dimension of wheel 10 is bore 28, which is the only finish machined surface, as both the diameter of the bore and the location of longitudinal axis 30, which is the axis of bore 28 and the axis of wheel 10. Misalignment or displacement of axis 30 from the center of wheel 10 would impliedly turn wheel 10 into the lobe of a cam shaft. Therefore, the significance of the location of axis 30, as well as bore 28, is readily apparent and it is understood that both the physical dimensions and their relative location are important considerations, as well as being AAR specified parameters.

Figure 6:
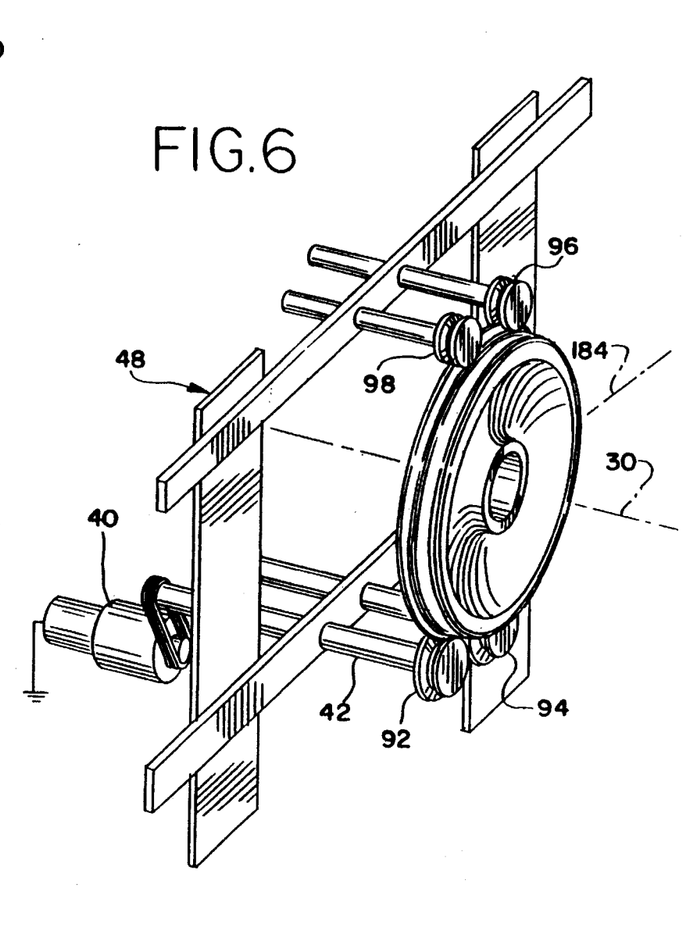

In FIG. 6, wheel 10 is nested in an arrangement of four sheave-like rollers 92, 94, 96 and 98, which are mounted on frame 48. Although frame 48 is shown as a stand-alone structure, it can be mounted to other apparatus to transfer wheel 10 to test apparatus 44. Roller 92 is illustrated as coupled to a drive means or motor 40 by shaft 42, which provides the means to rotate wheel 10 during a test cycle. This latter drive arrangement is illustrative only and not a limitation. Each of rollers 92, 94, 96 and 98 is shown with a slot or depression between a forward and back sheave, which slots are operable to receive flange 20 for retaining wheel 10 in a test position. In the present illustration, wheel 10 is provided in a vertical test position, but it is known that the tests may be conducted with wheel 10 in a horizontal or angled position, and thus orientation of wheel 10 is not a limitation to the present invention. Frame structure 48 must be strong enough to capture wheel 10 during transfer and to retain wheel 10 in its secured position for testing, which testing includes rotation of wheel 10 in the several rollers 92 to 98.

Figure 2:
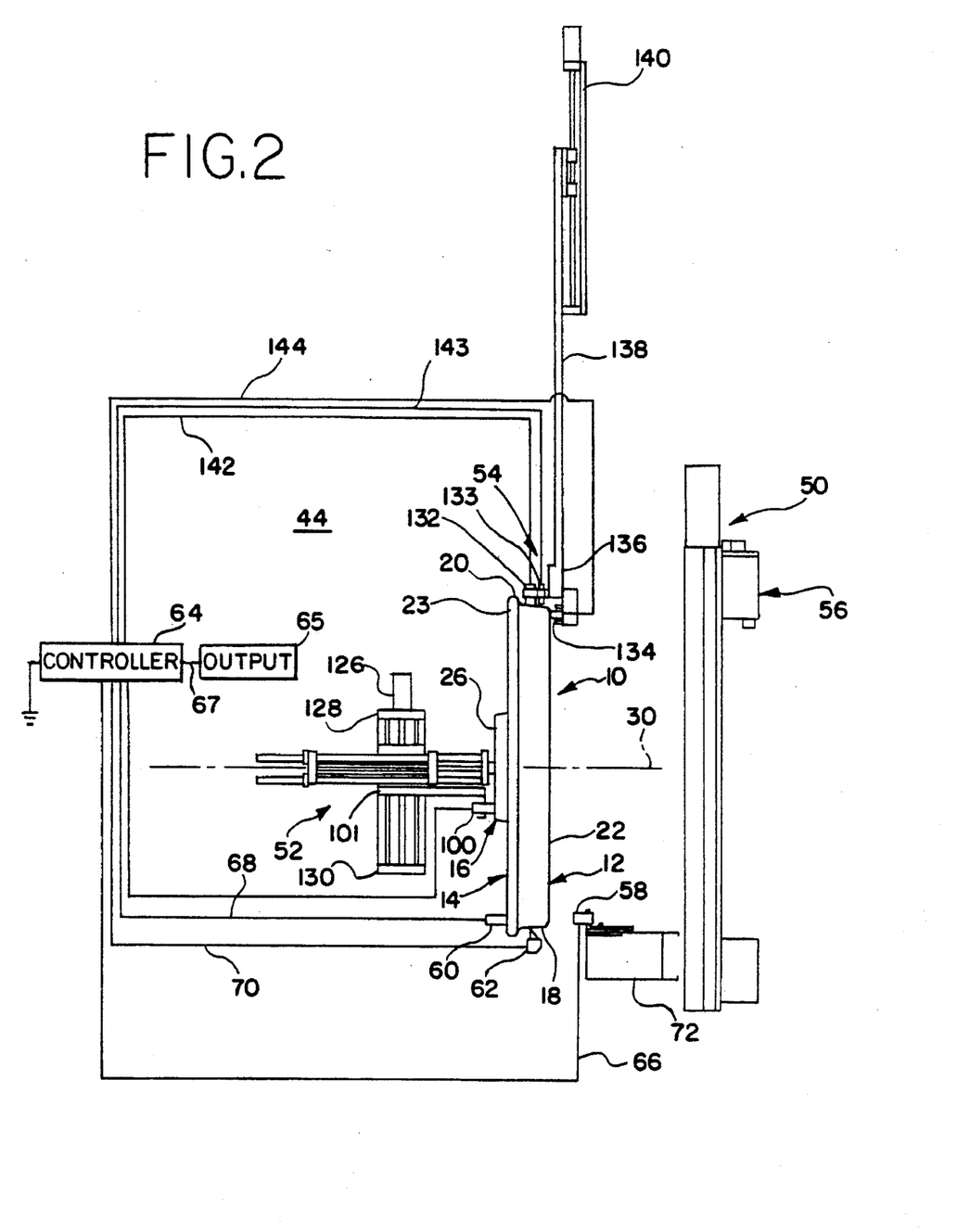
FIG. 2 is an elevation view of the spatial relationships between the sensor subassemblies and a vertically aligned wheel.

In FIG. 2, wheel 10 is shown in its test position without supporting rollers 92 to 98, which provides the necessary clearance to illustrate the relative position of first sampling subassembly 50, second sampling subassembly 52 and third sampling subassembly 54 of test apparatus 44, which subassemblies 50, 52 and 54 include their individual sensors and locating apparatus. First sampling subassembly 50 is a three-axis assembly with drive apparatus 56, which is operable to move first sensor 58, such as a Turck inductive sensor model BI10M30LIU, to track tread front face 22. Subassembly 50 also includes second sensor 60, also an inductive sensor, mounted in a fixed position in proximity to tread rear face 23; and, third sensor 62, which is illustrated as a laser sensor such as AROMAT laser sensor model MQLAS4LAC120S15, in proximity to tread 18. Inductive sensors, such as sensors 58 and 60, provide a sensed signal of location and area or discontinuity, which area of measurement is not a point contact but a field of magnetic inductance, and the sensed output signals are communicated to controller 64 by connecting lines 66 and 68, respectively. Third sensor 62 in this preferred embodiment is a laser sensor, which provides a point source on tread 18. Controller 64 is coupled to an output device 65 by line 67, which output device 65 may be a printer, recorder or other apparatus.

Similarly, laser sensor 62 communicates a point contact signal to controller 64 through line 70.

Figure 4:
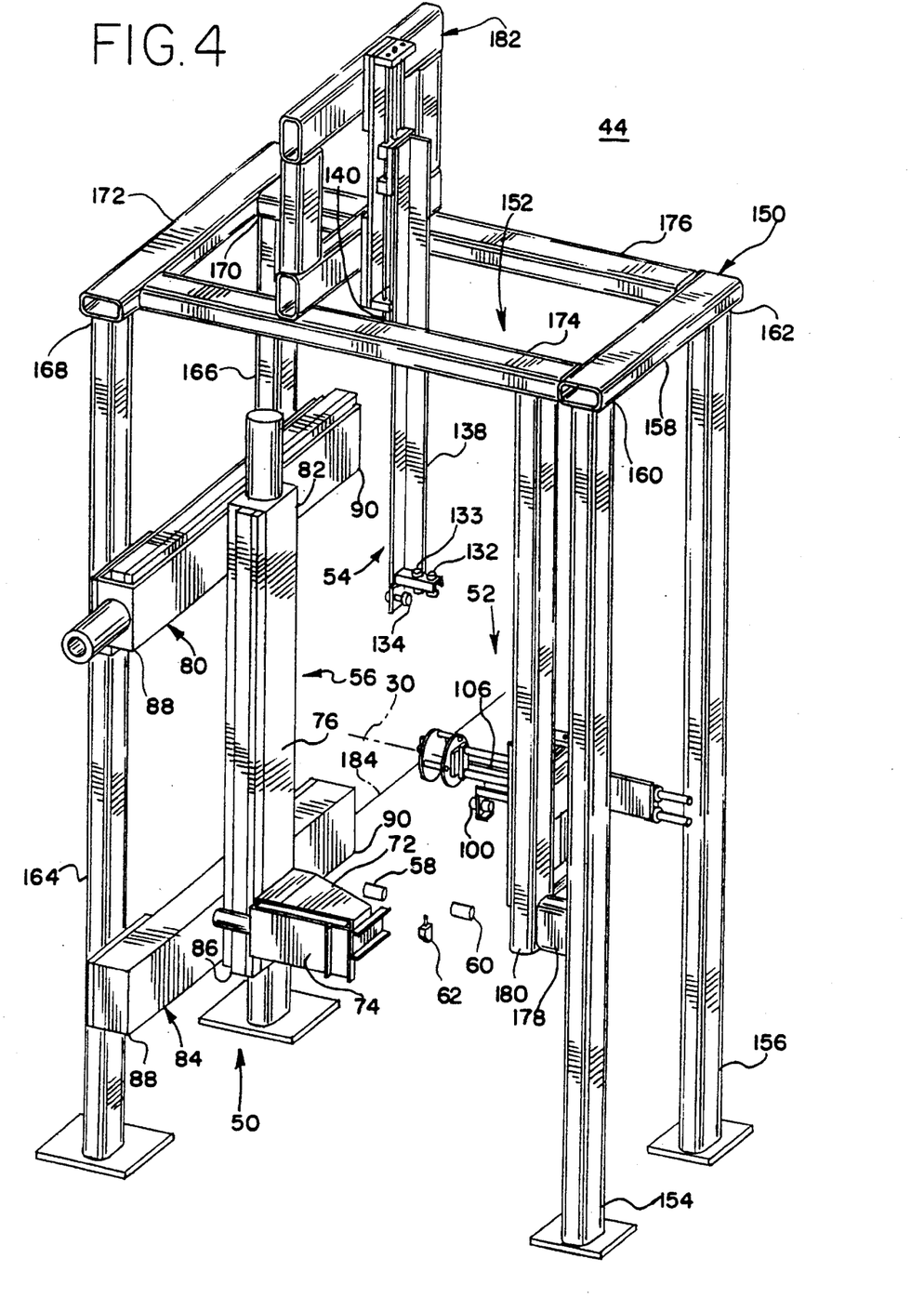
FIG. 4 is an oblique plan view of a structural support apparatus for the sampling subassemblies and their relative spatial positions.
Figure 5:
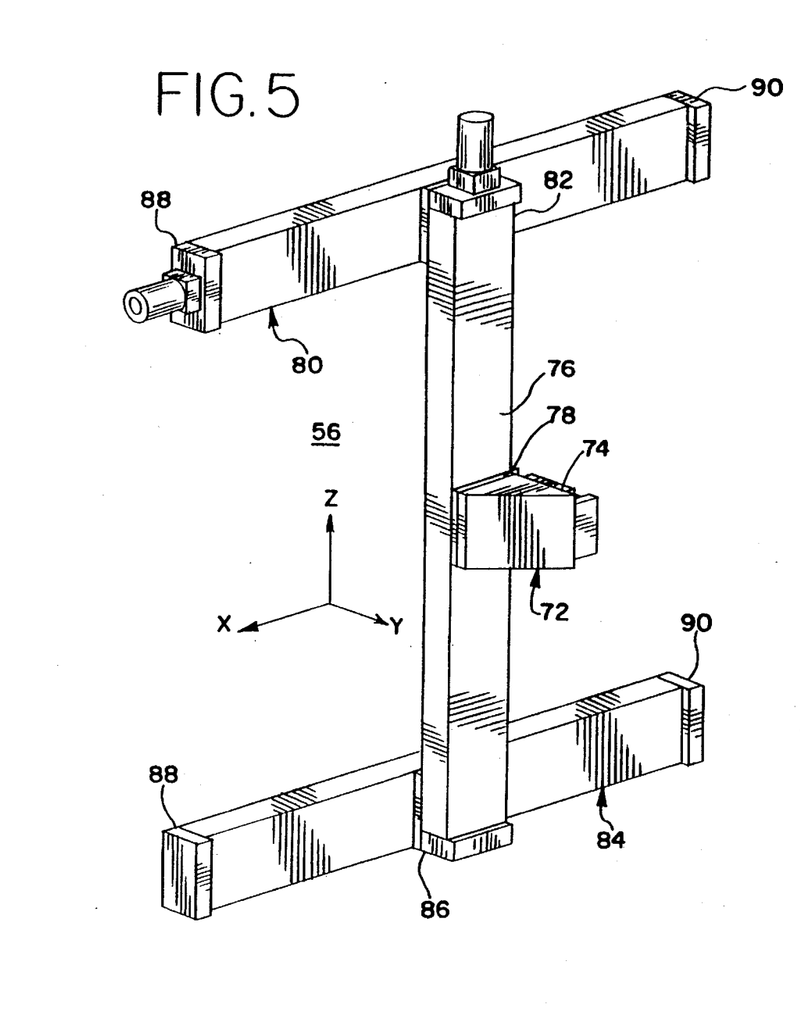
FIG. 5 is an enlarged oblique plan view of the three-axis drive assembly for the first sampling subassembly; and, FIG. 6 is a schematic oblique elevation of a railway wheel in the vertical fixture position mounted on sheave-like rollers.

In this configuration, drive apparatus 56 has sensor 58 mounted on extendable mounting head 72, which may be laterally extended on slide arm 74 noted in FIGS. 4 and 5. Extendable mounting head 72 at its second end 78 is mounted and slidable on second slide arm 76 for vertical translation of mounting head 72 and consequently vertical motion of mounting head 72. Second slide arm 76 is attached to upper drive arm 80 at its upper end 82 and to lower drive arm 84 at lower end 86 of second slide arm 76. Second slide arm 76 is movable between first end 88 and second end 90 of upper and lower drive arms 80 and 84. In this manner, sensor 58 can be moved in a three-axis motion, as depicted by the noted Cartesian coordinated axes in FIG. 5, and thus can be utilized to sense the relative position of wheel 10 and particularly any of tread front face 22 and hub front face 24 at a resting and retained position in rollers 92, 94, 96 and 98 in FIG. 6. Tracing of front faces 22 and 24 and communication of the sensed signals from sensor 58 to controller 64 allows electronic mapping of these faces and the establishment of a virtual reference plane at the front face of wheel 10, which plane is defined in comparison to calibration data provided from a standard test wheel.

Figure 3:
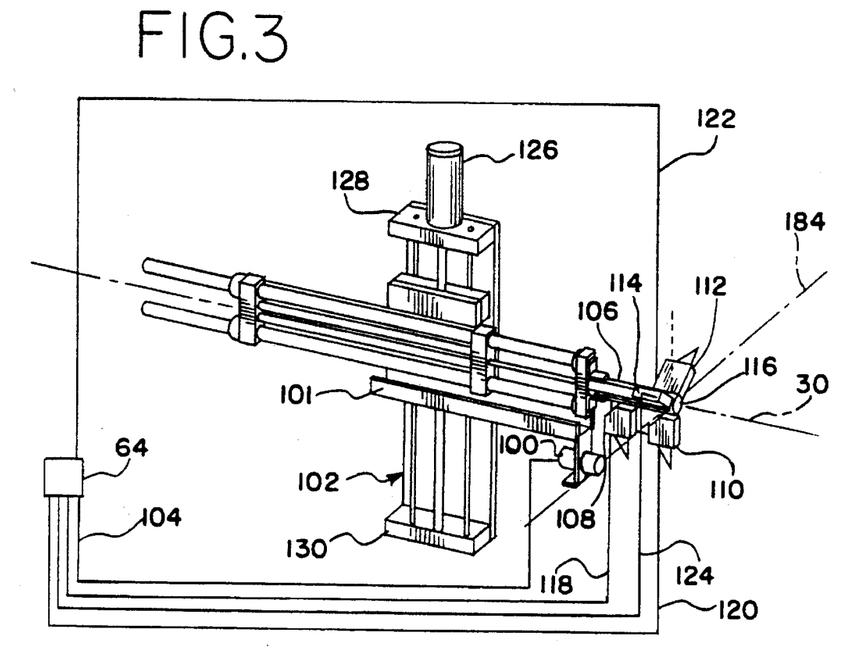
FIG. 3 is an enlarged view of the second sensor subassembly for the hub and bore, and its mounting and drive unit.

Second sampling subassembly 52 is particularly directed to the mapping of hub 16 and bore 28. In FIG. 3, subassembly 52 has third inductive sensor 100 mounted in a relatively fixed position along axis 30 on bracket 101, which extends from second mounting apparatus 102. Third inductive sensor 100 is connected to controller 64 by line 104.

Subassembly 52 has arm 106 extendable along or parallel to axis 30 with a cluster of laser sensors 108, 110, 112 and 114 mounted on distal end 116 of arm 106, which sensors 108, 110, 112 and 114 are connected to controller 64 by respective lines 118, 120, 122 and 124. Sensors 110, 112 and 114 are provided in a circular arrangement at distal end 116 and are preferably in the same plane with an angular separation distance of 120° between successive sensors. Sensor 108 is aligned with and longitudinally displaced along arm 106 a short distance from sensor 110, which provides a second internal bore reading for determining the slope or taper, if any, of bore 28 between sensors 108 and 110.

Second mounting apparatus 102 has a second drive means 126 to move slide arm 106 and bracket 101 between its first end 128 and second end 130 for positioning arm 106 and the cluster of laser sensors 108 to 114 along axis 30 and thereafter extending arm 106 and the sensors into bore 28. This movement of mounting apparatus 102 also provides sensor 100 in proximity to hub rear face 26. In this manner, static signals from sensor 100 in cooperation with signals from sensor 58 during the above-noted mapping process provide an initial determination of the relative hub thickness between front and rear hub faces 24 and 26, respectively.

Third sampling subassembly 54 has fourth inductive sensor 132, fifth inductive sensor 133 and sixth inductive sensor 134 mounted on distal end 136 of arm 138. Third drive apparatus 140 is secured to arm 138 for vertically moving sensors 132 and 133 into proximity of tread 18 and similarly to provide sensor 134 in proximity of tread front face 22. Sensors 132, 133 and 134 are connected to controller 64 by lines 142, 143 and 144, respectively, for communication of the sensed signals to controller 64.

Figure 4A:
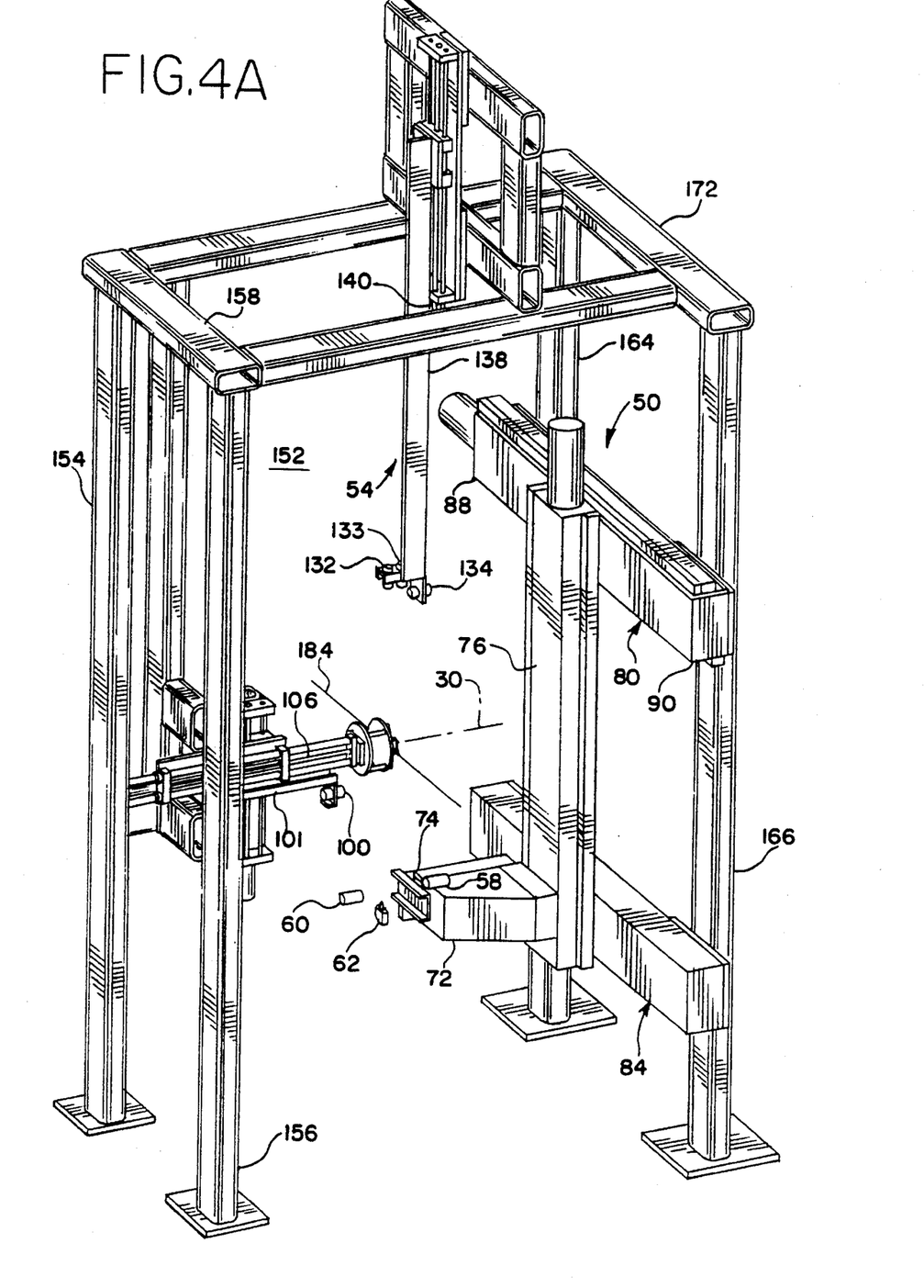
FIG. 4A is an oblique plan view of the support of FIG. 4 from the opposite direction.
Figure 4B:
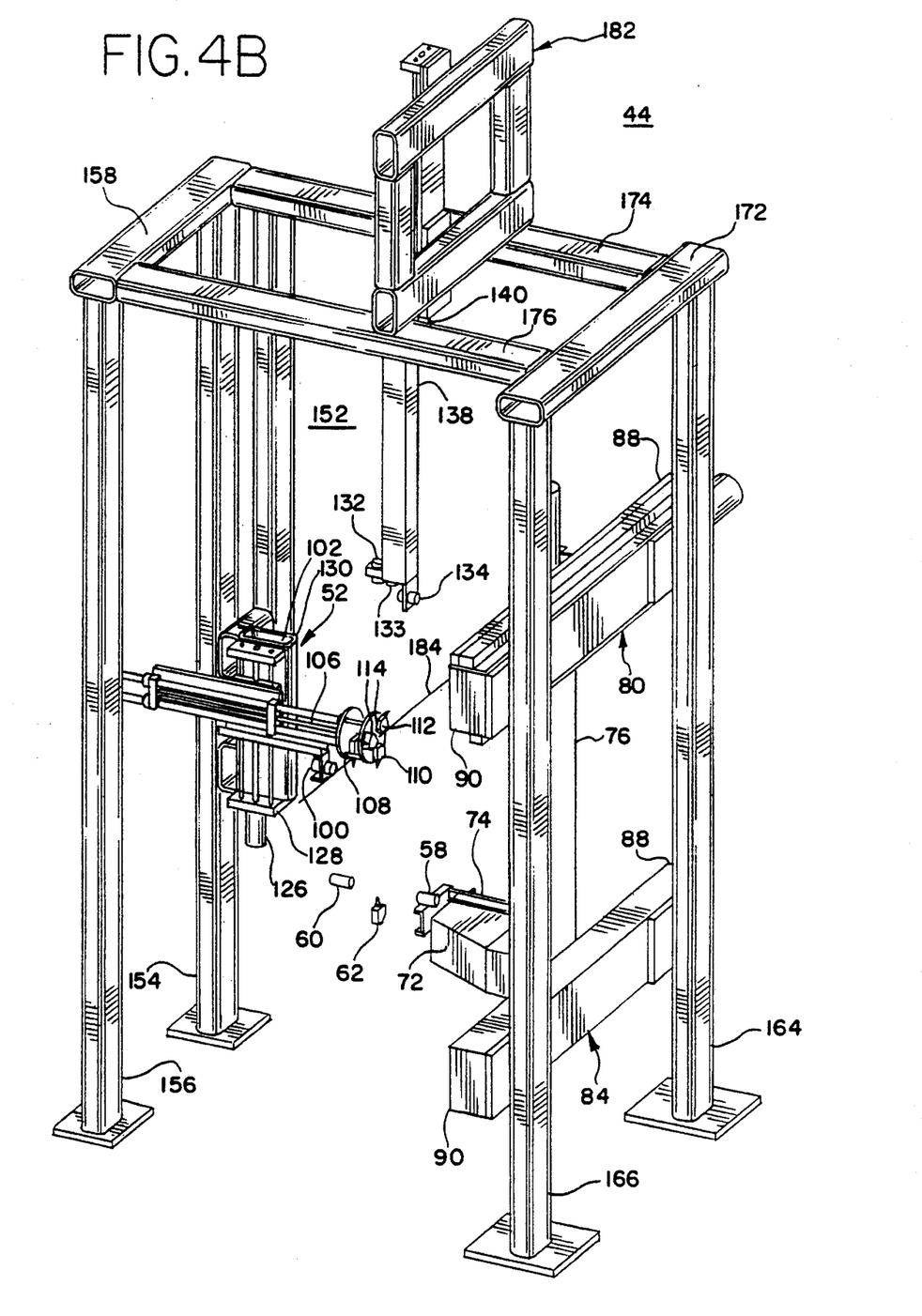
FIG. 4B is an oblique plan view of the support of FIG. 4 noting the position of the sampling apparatus of FIG. 3.

In FIGS. 4, 4A and 4B, test apparatus 44 is illustrated as having sampling subassemblies 50, 52 and 54 mounted on frame structure 150, which structure 150 is mountable about wheel-supporting frame structure 48 to provide wheel 10 in position within enclosure 152 of frame 150. More specifically, frame 150 has a first pair of upright parallel columns 154 and 156 connected by cross-brace 158 at their upper ends 160, 162, respectively. Second pair of upright parallel columns 164 and 166 are in a facing relationship with first columns 154, 156 and are connected at their respective vertical upper ends 168, 170 by second cross-brace 172. The two pairs of vertical braces 154, 156 and 164, 166 are connected at their facing upper ends 160, 168 and 162, 170 by upper parallel frame sections 174 and 176, respectively. Framed structure 150 thereby provides enclosure 152 within the several framing members. As shown in these figures, first sampling subassembly 50 within enclosure 152 is mounted and operable on frame members 164 and 166 with second slide arm 76 generally parallel to frame members 164, 166. Second sampling subassembly 52 is secured to column 154 by bracket 178 and brace 180 between vertical column members 154 and 156 in enclosure 152, which brace 180 is connected to upper frame section 174 and bracket 178. Third sampling subassembly 54 is mounted on a rectangular support component 182, which itself is secured between upper frame sections 174 and 176. In this configuration, drive member 140 is operable to vertically move arm 138 to provide sensors 132, 133 and 134 in position with wheel 10. The specific location of wheel 10 in these figures may be noted by the intersection of wheel longitudinal axis 30 and a wheel horizontal transverse axis 184, which axes 30 and 184 are noted in FIG. 3.

In these figures, wheel 10 and wheel-support frame 48 are not shown to more clearly illustrate the relative position and movement of the plurality of sensors and their drive apparatus. However, it is clear that wheel support frame 48 in FIG. 6 can be superimposed into enclosure 152 to provide wheel 10 into position for testing. In FIG. 4, the relative location of sensors 58, 60 and 62 as well as drive apparatus 56 of subassembly 50 at the initial stage awaiting wheel 10 are clearly noted, and in this illustration, extendable arm 106 of second subassembly 54 is extended to move sensors 100, 108, 110, 112 and 114 into their proper spatial position for analysis of wheel 10. Similarly, sensors 132, 133 and 134 are in their proper position for wheel testing.

Prior to testing of as-manufactured wheels 10, test apparatus 44 is calibrated by a standardized rail wheel or gage, which is introduced into the test stand and thereafter cycled through the various tests to check the calibration of the sensors and controller 64. This standardized wheel is also utilized to evaluate the alignment and positions of the various sensors, rollers and drive means. In operation of test apparatus 44, wheel 10 is transferred into enclosure 152 and positioned on rollers 92, 92, 96 and 98 prior to the positioning of the sensors of subassemblies 50, 52 and 54. The transfer apparatus may include automatic devices or manual placement. In this testing position, wheel 10 may be marked to provide a location site for limiting the number of revolutions and to insure at least one complete revolution of wheel 10, alternatively such location site may be the Brinnell hardness test location required by the AAR. In this static position of wheel 10, fixed position sensors 60 and 62 are in line to initiate their analytic tests. Mounting head 72 and sensor 58 are moved into position on slide arm 74 by drive apparatus 56. Thereafter, first subassembly drive means 56 moves mounting head and sensor 58 about wheel outer face 12 and more particularly about tread front face 22, which effectively maps the front face of wheel 10 and defines a virtual reference plane. The plane defined by drive means arms 76 and 80 is considered to be a flat plane and thus rotation of sensor 58 at a fixed distance from this plane while sensing the relatively smooth contours of wheel front face 12 provides the necessary data to evaluate such surface as a reference for the remaining tests. Subsequently front hub face 24 is similarly mapped by sensor 58 in a like manner. The sensed data is communicated to controller 64 and retained as a comparative reference to the data received during the dynamic testing from the rotation of wheel 10. It is recognized that drive means 56 may not generate an absolutely flat plane, but it is noted that drive means 56 will provide a repeatable path. This path can be gaged against the standardized wheel for evaluation of the path defined by drive means 56 and for comparison of the virtual reference plane defined for a wheel during testing.

As slide arm 74 was advanced to position sensor 58 in proximity to front face 12, second drive means 126 moves bracket 101 to position sensor 100 in proximity to rear hub face 24 and arm 106 is extended to move the cluster of sensors 108, 110, 112 and 114 into bore 128. Also, third subassembly 54 is positioned above tread 18 and near tread front face 22 at about the vertical top of wheel 10 in FIG. 2. In this alignment of sensors, laser sensors 110, 112 and 114, which are in a common plane, can be utilized to determine the center line 30 of bore 28, as well as the static diameter of bore 28. Sensor 108, which is in line with sensor 110 along axis 30 can be utilized to measure any tipping or taper in bore 28. In addition, inductive sensor 100 provides a signal to controller 64, which with the data from sensor 58 will indicate a static hub thickness. All of the data may be compared to or from the defined virtual reference plane of wheel 10.

At the conclusion of the static tests, wheel 10 is rotated by motor 40 and roller 92 to provide a plurality of tests for dimensions, locations and orientations. Indicative of the tests and parameters measured are the following:

a. Sensors 62 and 132 cooperate to measure tread diameter in a single plane during rotation of the wheel by taking 360 separate measurements, and controller 64 can average all readings to provide an average diameter, although the number of measurements can be increased or decreased depending upon the speed of each test cycle and the analytical speed of the test devices;

b. Sensors 110 and 62 cooperate to measure wheel radius from the edge of bore 28 to tread 18;

c. Sensors 110, 112 and 114 cooperate to measure bore diameter;

d. The measurements from items 2 and 3 can be used by controller 64 to indicate the variation in the radius from the center of the bore for lack of rotundity;

e. Rim thickness (X in FIG. 1) can be measured by sensor 58 and sensor 132;

f. Front tread face or rim face 22 warpage can be determined by the difference between the maximum and minimum readings during front face mapping, which is effectively a comparison with the calibration from the standardized wheel;

g. Overall wheel warpage is determinable by the difference between the back rim face readings from sensor 60 to the reference or best fit plane from front face mapping;

h. The average tread width may be calibrated as the difference between the tread front face 22 points and tread rear face 23 points, which are outputs from sensors 58 and 60 or 134 and 60;

i. The bore length may be calculated by outputs from sensor 58 (mapping front hub face 24) and sensor 100;

j. Position of the bore center to the wheel center is determinable by the variation in the radius;

k. Bore angle may be determined by variation in bore radius from sensor 108 to sensor 110;

l. The projection of back hub face 26 above the wheel rear face is determinable by the average distance from the front hub to the front rim face plane (mapped reference plane) plus the average tread width less the bore length (both previously determined);

m. The hub tilt is determinable by evaluating the each sensed point to the reference plane distance for the front hub face to the front rim face and noting the maximum less the minimum variation.

Although there are numerous electronic measuring devices for individual test applications to evaluate various parameters, the above plurality of tests are conducted on a large, cumbersome and awkward test piece, a railway wheel 10, with no manual contact and with a process cycle time of less than 60 seconds.

While only a specific embodiment of the invention has been described and shown, it is apparent that various alternatives and modifications can be made thereto. It is, therefore, the intention in the appended claims to cover all such modifications and alternatives as may fall within the true scope of the invention.

We claim:

1. A non-contact test apparatus for a railroad wheel, said wheel having a front face, a rear face, a tread with a tread face and an outer diameter, an inner bore with an inner bore diameter, a perimeter with a flange at said perimeter, a rear flange face, a front flange face in proximity to said tread face, a generally centrally located hub, a rear hub face, a front hub face, said inner bore being generally centrally located and extending through said hub and having a wheel axis, said tread having a tread front face at the perimeter of said wheel front face and a circumference with a tape line thereon, said test apparatus comprising:

a holding fixture for said wheel, which fixture is operable to retain said wheel in a test orientation and to rotate said wheel for analysis of test parameters;

a plurality of non-contact laser sensors and magnetic induction sensors, each of said sensors operable to sense at least one of a point and a real location on a wheel surface and provide an output signal of said at least one point and a real location as a sensed parameter;

a first and three-axis sampling assembly for mapping a reference plane and fixing a coordinate relationship for said railroad wheel, said first assembly having a first induction sensor positionable in proximity to said tread front face, a second induction sensor in proximity to said flange rear face and a first laser sensor in proximity to said tread for sensing a plurality of data points about the perimeter of the wheel, across the front and rear faces of said wheel and between the front face and rear face of said wheel;

a second and two-axis sampling assembly having a third induction sensor, a cluster of laser sensors with a second laser sensor, a third laser sensor, a fourth laser sensor and a fifth laser sensor, said laser sensors positionable in said wheel bore, said cluster of laser sensors having at least one sensor for noting the inner bore diameter, and said third induction sensor sensing dimensional parameters of said wheel at a plurality of points in proximity to an outer surface of said wheel at said bore as said wheel is rotated in said fixture;

a third and fixed point sampling assembly having a fourth induction sensor in proximity to said tread and a fifth induction sensor in proximity to said tread front face; means for connecting;

means for receiving said output signals, which receiving means has a plurality of reference parameters for comparison to said output signals, the connecting means coupling said sensors and said receiving means for communication of said output signals to said receiving means for comparison to said reference parameters to provide an analytical output of said output signals and to describe dimensional characteristics of said wheel;

a three-axis positioning apparatus, said first sampling assembly mounted and movable on said positioning apparatus for locating said first induction sensor in proximity to said wheel and tread front faces, said positioning apparatus operable to trace said tread front face and said hub front face and communicate said sensed output signals to said receiving means to define a virtual reference plane of said wheel front face.

2. A non-contact test apparatus for a railroad wheel as claimed in claim 1 further comprising a second positioning apparatus, said second sampling assembly mounted on said second positioning apparatus, which is operable to position said cluster of laser sensors in said wheel bore to locate a longitudinal center line of said bore and railroad wheel during rotation of said wheel by said fixture, and to position said third induction sensor in proximity to said rear hub face, said second-sampling-assembly sensors communicating said output sensed signals to said receiving means for evaluation with said output signals from said first sampling assembly sensors to provide comparative signals to indicate test parameters for comparison to wheel specifications.

3. A non-contact test apparatus for a railway wheel as claimed in claim 2, wherein said third sampling assembly is mountable on a third positioning apparatus, which is linearly extendible to provide said fourth and fifth induction sensors in a predetermined location in proximity to said wheel tread and said tread front face, said wheel rotatable in said fixture to move said tread and tread front face, respectively, past said third sampling assembly sensors for sampling a plurality of locations on said tread and tread front.

* * * * *